United States Patent
Murphy et al.

(10) Patent No.: US 7,059,446 B2
(45) Date of Patent: Jun. 13, 2006

(54) FRAME-BASED BLADDER APPARATUS FOR SEAT OCCUPANT WEIGHT ESTIMATION

(75) Inventors: Morgan D. Murphy, Kokomo, IN (US); Craig A Tieman, Westfield, IN (US); Duane D. Fortune, Lebanon, IN (US); James R. McKinley, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 278 days.

(21) Appl. No.: 10/608,844

(22) Filed: Jun. 27, 2003

(65) Prior Publication Data

US 2004/0262048 A1   Dec. 30, 2004

(51) Int. Cl.
B60K 28/04 (2006.01)
G01G 5/04 (2006.01)

(52) U.S. Cl. .................. 180/273; 280/735; 177/144; 177/254

(58) Field of Classification Search ............. 177/136, 177/144, 208–209, 210 R, 254; 180/273; 280/735; 701/45
See application file for complete search history.

(56) References Cited

U.S. PATENT DOCUMENTS

| | | | | |
|---|---|---|---|---|
| 3,305,036 | A | * | 2/1967 | Walters ................... 177/209 |
| 4,583,606 | A | * | 4/1986 | Menon ..................... 177/208 |
| 5,474,327 | A | | 12/1995 | Schousek ................. 280/735 |
| 5,918,696 | A | * | 7/1999 | VanVoorhies ............ 180/273 |
| 5,942,695 | A | | 8/1999 | Verma et al. .............. 73/768 |
| 5,987,370 | A | | 11/1999 | Murphey et al. ........... 701/45 |
| 6,012,007 | A | | 1/2000 | Fortune et al. ............ 701/45 |
| 6,056,079 | A | * | 5/2000 | Cech et al. ............... 180/273 |
| 6,058,341 | A | | 5/2000 | Myers et al. .............. 701/45 |
| 6,089,105 | A | * | 7/2000 | Patel et al. ............. 73/862.582 |
| 6,101,436 | A | | 8/2000 | Fortune et al. ............ 701/45 |
| 6,138,067 | A | | 8/2000 | Cobb et al. ............... 701/45 |
| 6,246,936 | B1 | | 6/2001 | Murphey et al. ........... 701/45 |
| 6,259,167 | B1 | * | 7/2001 | Norton ..................... 307/10.1 |
| 6,360,618 | B1 | | 3/2002 | Anahid et al. ......... 73/862.627 |
| 6,424,898 | B1 | | 7/2002 | Anishetty et al. .......... 701/45 |
| 6,438,476 | B1 | | 8/2002 | Gray et al. ............... 701/45 |
| 6,438,477 | B1 | | 8/2002 | Patterson et al. ........... 701/45 |
| 6,479,776 | B1 | | 11/2002 | Nakase et al. ............ 200/559 |
| 6,490,936 | B1 | | 12/2002 | Fortune et al. ........ 73/862.581 |

(Continued)

OTHER PUBLICATIONS

"Fluid Load Cell Weight Classification System", Anoymous, Kenneth Mason Publications, Hampshire, GB, vol. 415, No. 20, ISSN: 0374-4353, Nov. 1998.*

(Continued)

*Primary Examiner*—Randy W. Gibson
(74) *Attorney, Agent, or Firm*—Stefan V. Chmielewski

(57) ABSTRACT

A frame-based occupant weight estimation apparatus for a vehicle seat that is supported by two or more floor brackets secured to the vehicle floor spans an open space between the floor brackets to prevent shunting of the occupant weight through a foreign object lying on the floor between the floor brackets. The weight estimation apparatus includes a fluid filled bladder sandwiched between first and second rigid plates, and is held in place between the seat frame and the floor brackets by a set of fasteners. A spring preloads the bladder so that deviations of the bladder fluid pressure from the preload pressure will be indicative of occupant weight. The first plate spans the open space between the floor brackets so that the fluid pressure is indicative of occupant weight even in cases where a portion of the occupant weight is supported by a foreign object disposed between the floor brackets.

4 Claims, 2 Drawing Sheets

U.S. PATENT DOCUMENTS

| | | | |
|---|---|---|---|
| 6,542,802 B1 | 4/2003 | Gray et al. | 701/45 |
| 6,578,871 B1 | 6/2003 | Gray et al. | 280/735 |
| 6,587,770 B1 | 7/2003 | Gray et al. | 280/735 |
| 6,927,678 B1* | 8/2005 | Fultz et al. | 340/438 |

OTHER PUBLICATIONS

Document RD 415020A "Fluid Load Cell for Motor Vehicle Seat Weight Classification for Tailoring Airbag Deployment", Anonymous, Derwent Information Ltd., Oct. 20, 1998.*

Document RD 415059A "Load Cell for Use in Vehicle Seat to WeightOccupatn/content to Provide Classification for Tailoring Airbag Deployment", Anonymous, Derwent Information Ltd., Oct. 20, 1998.*

* cited by examiner

US 7,059,446 B2

FRAME-BASED BLADDER APPARATUS FOR SEAT OCCUPANT WEIGHT ESTIMATION

TECHNICAL FIELD

This invention is directed to apparatus for detecting the weight of an occupant of a motor vehicle seat for purposes of determining whether and how forcefully to deploy supplemental restraints, and more particularly to apparatus for measuring forces applied to a frame of the vehicle seat.

BACKGROUND OF THE INVENTION

Vehicle occupant detection systems are useful in connection with air bags and other pyrotechnically deployed restraints as a means of judging whether, and how forcefully, to deploy the restraint. One fundamental parameter in this regard is the weight of the occupant, as weight may be used as a criterion to distinguish between an adult and an infant or small child.

Most prior weight estimation techniques involve installing a pressure sensitive element such as a variable resistance pad or a fluid filled bladder in or under a vehicle seat cushion, and utilizing the pressure measurement as an indication of occupant weight. See, for example, the U.S. Pat. Nos. 5,474,327, 5,987,370, 6,246,936, 6,101,436 and 6,490,936, assigned to the assignee of the present invention and incorporated by reference herein.

Alternatively, the occupant weight may be measured with one or more load cells that sense the forces (strain or pressure) that the seat applies to a bracket that supports the seat on the vehicle floor. See, for example, the Publication Nos. 41520, 41542, 41549 and 41559 from the November, 1998 issue of Research Disclosure. However, frame-based weight estimation is subject to significant error in cases where a foreign object such as a beverage container is placed on the floor under the seat and the undercarriage of the seat comes into contact with the object when occupant weight causes downward deflection of the seat cushion and springs. In such cases, a significant portion of the occupant weight can be shunted to the floor through the object instead of the seat frame and floor brackets, and the frame-based force measurement will indicate an erroneously low occupant weight. Accordingly, what is needed is a frame-based occupant weight estimation apparatus that is not subject to error due to partial load shunting through foreign objects placed under the seat.

SUMMARY OF THE INVENTION

The present invention is directed to an improved frame-based occupant weight estimation apparatus for a vehicle seat that is supported by two or more brackets secured to the vehicle floor, where the weight estimation apparatus includes a load-cell that spans an open space between the floor brackets to prevent shunting of the occupant weight through a foreign object lying on the floor between the floor brackets. The load cell includes a fluid filled bladder sandwiched between first and second rigid plates, and is held in place between the seat frame and the floor brackets by a set of fasteners. A spring preloads the bladder so that deviations of the bladder fluid pressure from the preload pressure will be indicative of occupant weight. The first plate spans the open space between the floor brackets so that the fluid pressure is indicative of occupant weight even in cases where a portion of the occupant weight is supported by a foreign object lying on the floor between the floor brackets.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
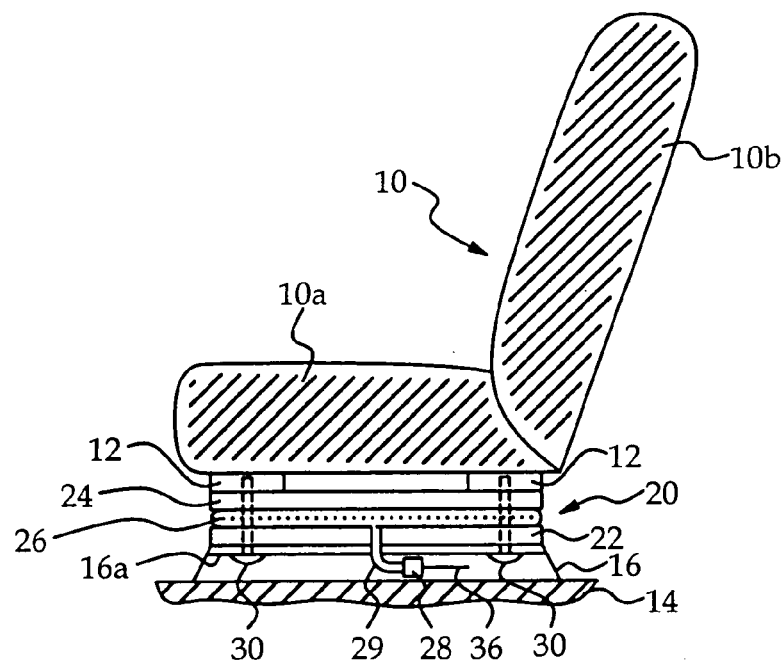
FIG. 1 is a side-view diagram of a vehicle seat incorporating the frame-based occupant weight estimation apparatus of the present invention.

Referring to the drawings, and particularly to FIG. 1, the reference numeral 10 generally designates a vehicle seat, including seat and backrest cushions 10a, 10b supported on a frame including a set of mounting pads 12. In the illustrated embodiment, there are four mounting pads: left front, right front, left rear and right rear, each designated by the reference numeral 12. The seat 10 is secured to the vehicle floor 14 by a pair of laterally spaced floor brackets 16, 18 that are bolted to floor 14, and a load cell 20 is interposed between the seat frame mounting pads 12 and the floor brackets 16, 18 for estimating the weight of a seat occupant.

Figure 2A:
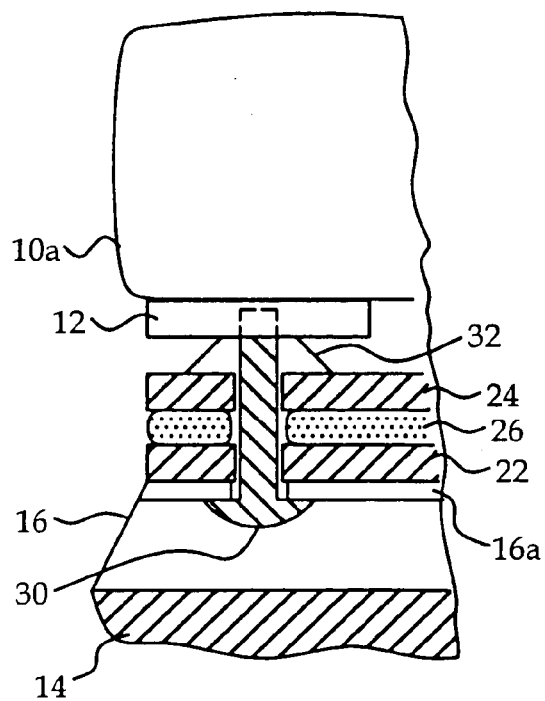
FIGS. 2A and 2B depict first and second embodiments of the apparatus of FIG. 1.
Figure 2B:
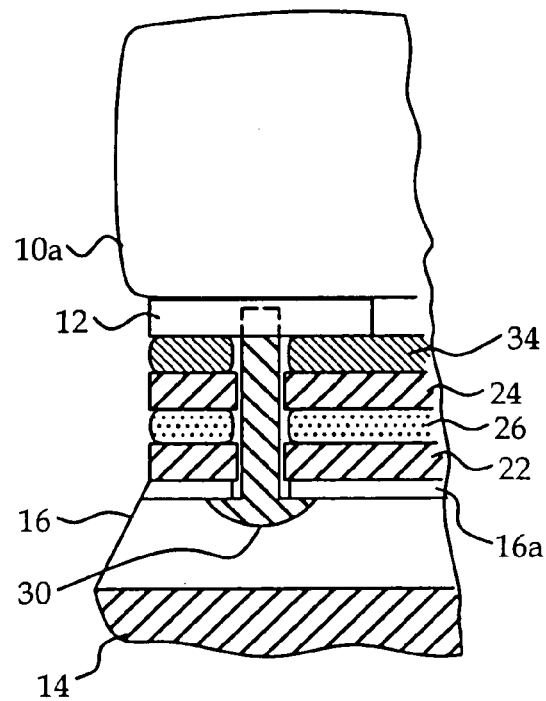

The load cell 20 includes first and second rigid plates 22 and 24, a fluid-filled elastomeric bladder 26 interposed between the plates 22 and 24, and a pressure sensor 28 coupled to a bladder exit port 29 for detecting the fluid pressure within bladder 26. In the illustrated embodiment, the floor brackets 16, 18 include integral flanges 16a, 18a, and the seat 10 and load cell 20 are secured to the floor brackets 16, 18 by a set of bolts 30 that seat against flanges 16a, 18a and thread into suitable openings formed in the seat frame mounting pads 12. As seen most clearly in FIGS. 2A–2B, the plates 22, 24 and bladder 26 are apertured to receive the bolts 30, and a compliant element such as the flat spring 32 of FIG. 2A or the foam pad 34 of FIG. 2B takes up the space between the mounting pads 12 and the plate 24 and exerts a preload force on the bladder 26. Essentially, the bolts 30 provide a non-compliant coupling between the floor brackets 16, 18, and the spring 32 or foam pads 34 provide a compliant coupling for preloading the bladder 26. Of course, the springs 32 or foam pads 34 could alternatively be placed between the floor brackets 16, 18 and the plate 22, if desired. Also, the orientation of the bolts 30 could be reversed, if desired.

Figure 3:
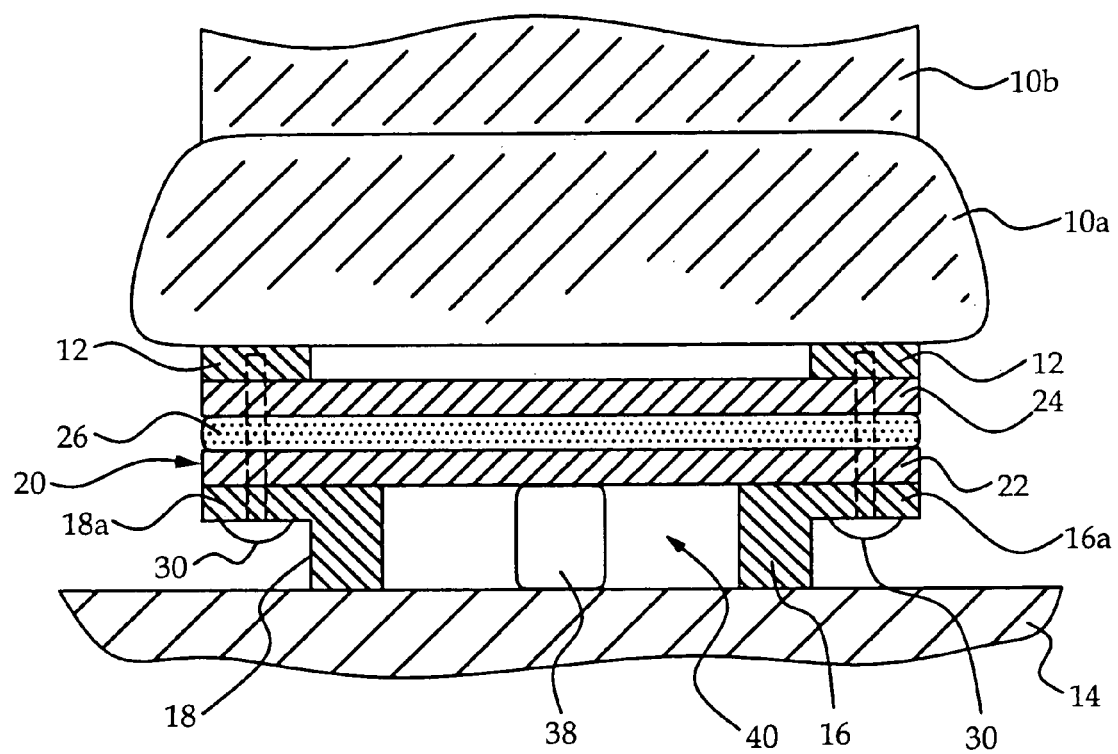
FIG. 3 is a front-view diagram of a vehicle seat incorporating the frame-based occupant weight estimation apparatus of FIG. 1.

In operation, the output signal of pressure sensor 28 on line 36 is supplied to a controller (not shown) that converts the pressure signal into a corresponding weight or weight classification and determines whether and how forcefully to deploy supplemental restraints designed to protect the occupant from serious injury in a crash event. As demonstrated in FIG. 3, the design of the load cell 20 protects the pressure signal from corruption due to the presence of foreign objects 38 in the open space 40 bounded by the floor brackets 16, 18 and the floor 14. Since the rigid plate 22 spans the open space 40, the load cell 20 is responsive to the occupant weight even if the object 38 is large enough and strong enough to provide an alternative load path between the seat 10 and the floor 14. This can occur, for example, if the object 38 is a metal beverage container, or the like.

In summary, the present invention provides a frame-based bladder apparatus that provides an accurate estimate of seat occupant weight, and that is substantially insensitive to the presence of foreign objects under the seat that shunt a portion of the occupant weight to the floor. To this end, the plates 22, 24 are characterized herein as rigid, and the selection of the plate material and thickness for achieving the desired rigidity will vary depending on considerations such as the distance between the floor brackets 16, 18. In a particular mechanization of the present invention, for example, the plates 22 and 24 were formed of aluminum having a thickness of 0.090 inches. Also, the rigidity may be increased by forming integral flanges on the plates 22, 24.

While illustrated in respect to the illustrated embodiment, it will be recognized that various modifications in addition to those mentioned above may occur to those skilled in the art. For example, the flat springs 32 could be replaced with coil springs, and so on. Also, the rigid plates 22, 24 may be integrated into the structure of the seat 10, and so on. Accordingly, it will be understood that systems incorporating these and other modifications may fall within the scope of this invention, which is defined by the appended claims.

What is claimed is:

1. An apparatus for estimating the weight of an occupant of a vehicle seat including a seat cushion frame assembly having characteristic lateral width and longitudinal depth dimensions and supported by first and second laterally spaced floor brackets secured to a vehicle floor and extending upwardly therefrom to define upwardly facing mounting surfaces, the apparatus comprising:

a load cell including first and second substantially planar rigid plates, and a fluid-filled bladder interposed between said first and second rigid plates, said first and second rigid plates and said fluid-filled bladder juxtaposed to register with and substantially dimensionally correspond laterally and longitudinally with said seat cushion assembly to effect distribution of the combined load weight of the vehicle seat and occupant;

fastener means for securing said load cell between the frame of said seat and the mounting surfaces of said floor brackets such that said load cell spans an open space between said first and second floor brackets, said fastener means including compliant elements for pre-loading said bladder between said first and second plates, and substantially non-compliant elements for preventing separation of said seat from said floor brackets; and a pressure sensor coupled to an exit port of said bladder for sensing a pressure of the fluid in said bladder that provides an indication of the weight of the occupant.

2. The apparatus of claim 1, wherein said compliant elements are springs or foam pads interposed between said seat and said load cell.

3. The apparatus of claim 1, wherein said compliant elements are springs or foam pads interposed between said floor brackets and said load cell.

4. The apparatus of claim 1, wherein said non-compliant elements are bolts passing through adjacent registering apertures in said first and second rigid plates and fluid-filled bladder of said load cell.

* * * * *